US 6,629,589 B2

(12) United States Patent
Inoue

(10) Patent No.: US 6,629,589 B2
(45) Date of Patent: Oct. 7, 2003

(54) VEHICLE CLUTCH DRIVING DEVICE AND GEAR SHIFTING DEVICE OF VEHICLE TRANSMISSION

(75) Inventor: Akira Inoue, Suita (JP)

(73) Assignee: Exedy Corporation, Neyagawa ( * ) Notice: Subject to any disclaimer, the term of this patent is extended or adjusted under 35 U.S.C. 154(b) by 0 days.

(21) Appl. No.: 09/981,907

(22) Filed: Oct. 19, 2001

(65) Prior Publication Data

US 2002/0056601 A1 May 16, 2002

(30) Foreign Application Priority Data

Nov. 15, 2000 (JP) ........................... 2000-347886
Nov. 15, 2000 (JP) ........................... 2000-347887

(51) Int. Cl.[7] ............................................. F16D 25/14
(52) U.S. Cl. .................... 192/3.62; 192/3.58; 192/84.6
(58) Field of Search ............................. 192/3.62, 3.61, 192/3.55, 3.56, 3.58, 84.6

(56) References Cited

U.S. PATENT DOCUMENTS 4,567,969 A * 2/1986 Makita ...................... 192/3.56
5,896,963 A * 4/1999 Schwientek ............... 192/3.62
6,446,522 B1 * 9/2002 Warren et al. ................ 74/335

FOREIGN PATENT DOCUMENTS

DE 197 23 393 A1 12/1997
DE 196 50 160 A1 6/1998
JP 60-49130 A * 3/1985
JP 3-239865 A * 10/1991

* cited by examiner

Primary Examiner—Saul Rodriguez
(74) Attorney, Agent, or Firm—Shinjyu Global IP Counselors, LLP

(57) ABSTRACT

A vehicle driving system having a clutch actuator and gear shifting device that use motors is provided. A clutch is disengaged and engaged and gear shifting is conducted at high speeds. The clutch actuator drives the clutch and includes a motion converting mechanism and two motors. The motion converting mechanism is a mechanism for converting rotary motion to linear motion and for applying an operating force to the clutch. The two motors are for applying a rotating force to the motion converting mechanism. The gear shifting automatically shifts gears by driving a transmission rack of a transmission and includes a ball screw mechanism and two motors. The ball screw mechanism is a mechanism for converting rotary motion to linear motion and for applying an operating force to the transmission. The two motors are for applying a rotating force to the ball screw mechanism.

20 Claims, 5 Drawing Sheets

VEHICLE CLUTCH DRIVING DEVICE AND GEAR SHIFTING DEVICE OF VEHICLE TRANSMISSION

BACKGROUND OF THE INVENTION

1. Field of the Invention

The present invention relates to a vehicle clutch driving device and a gear shifting device of a vehicle transmission. More specifically, the present invention relates to a vehicle clutch driving device in which motors are used and to a device for driving the transmission by using motors.

2. Background Information

Manual transmissions are mainly employed in large vehicles such as a buses and trucks. In a conventional manual transmission, a change lever by the driver's seat and the transmission are mechanically connected by a linkage such as a control rod. Therefore, to drive a gear mechanism a shifting operation or operations are necessary. If the shifting operation is frequently required, the shifting operation becomes a great burden on the driver. Therefore, to solve this problem, a remotely operated manual speed change gear in which a gear shifting device is provided for a manual transmission. A transmission ECU for controlling the gear shifting device by using an electric signal has been developed. With this structure, shifting can be conducted by a small force from merely operating the change lever and the burden due to the shifting operation on the driver is reduced. Moreover, an automatic transmission in which a clutch actuator automatically engages and disengages a clutch is provided. A speed changing operation can be conducted without pressing the clutch pedal in order to further reduce the burden on the driver due to the shifting operation. There is also a so-called semiautomatic transmission in which it is possible to selectively switch between an automatic transmission and a manual transmission.

The clutch actuator for driving the clutch in response to the signal from the above-described transmission ECU is formed of a master cylinder, a motion direction converting mechanism, and a motor, for example. The master cylinder is connected to a slave cylinder disposed in a vicinity of a release device of the clutch. The motion converting mechanism is formed of a rod, a worm wheel, and a worm gear. The rod contacts a piston of a master cylinder. The worm wheel is fixed to an opposite end of the rod to form a crank mechanism. The worm gear is engaged with the worm wheel and fixed to a rotary shaft of a motor. If the motor rotates, the worm gear rotates the worm wheel. As a result, the rod moves linearly to drive the piston of the master cylinder. Thus, hydraulic pressure is supplied from the master cylinder to the slave cylinder and the slave cylinder drives the release mechanism thereby to disengage the clutch.

In a conventional manual transmission, a plurality of transmission racks is arranged in a select direction. The gear shifting device provided to the manual transmission shifts gears by driving the selected transmission rack in a shifting direction.

The gear shifting device includes a lever, a select direction moving mechanism, and a shift direction moving mechanism. The lever has one end which can be engaged with each rack. The select direction moving mechanism engages an intermediate portion of the lever for rotation. The select direction moving mechanism can move the lever in the select direction. The shift direction moving mechanism moves the transmission racks in the shift direction with one end of the lever by being engaged with and driving the other end of the lever. Each moving mechanism is formed of a ball screw mechanism for driving the rod in a longitudinal direction and a motor for applying a rotating force to the ball screw mechanism.

Driving the transmission racks and the disengaging/engaging operations of the clutch need to be conducted in a short time, but speed cannot be increased sufficiently due to an inertia component of the system.

In view of the above, there exists a need for vehicle clutch driving device and gear shifting device, which overcomes the above mentioned problems in the prior art. This invention addresses this need in the prior art as well as other needs, which will become apparent to those skilled in the art from this disclosure.

SUMMARY OF THE INVENTION

It is an object of the present invention to conduct clutch disengagement/engagement or gear shifting at high speeds in a clutch actuator in which motors are used.

A vehicle clutch driving device according to a first aspect of the present invention drives a vehicle clutch and includes a motion converting mechanism and two motors. The motion converting mechanism converts rotary motion to linear motion and applies an operating force to the clutch. The two motors apply a rotating force to the motion converting mechanism. In this clutch driving device, two motors are used, thus, the speed of the disengaging/engaging operations of the clutch can be increased.

A vehicle gear shifting device according to a second aspect of the present invention automatically shifts vehicle transmission gears and includes a motion converting mechanism and two motors. The motion converting mechanism converts rotary motion to linear motion and applies an operating force to the transmission. The two motors apply a rotating force to the motion converting mechanism. In this device, the two motors are used, thus, it is possible to shift gears at higher speeds than in the prior art.

A gear shifting device according to a third aspect of the present invention automatically shifts vehicle transmission gears and includes a first motion converting mechanism, two first motors, a second motion converting mechanism, and two second motors. The first motion converting mechanism converts rotary motion to linear motion and applies an operating force in a select direction to the transmission. The two first motors are members applies a rotating force to the first motion converting mechanism. The second motion converting mechanism converts rotary motion to linear motion and applies an operating force in a shift direction to the transmission. The two second motors applies a rotating force to the second motion converting mechanism. In this device, because the two motors are used in each the motion converting mechanism, it is possible to shift gears at higher speeds than in the prior art.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS (1) Entire Structure

Figure 1:
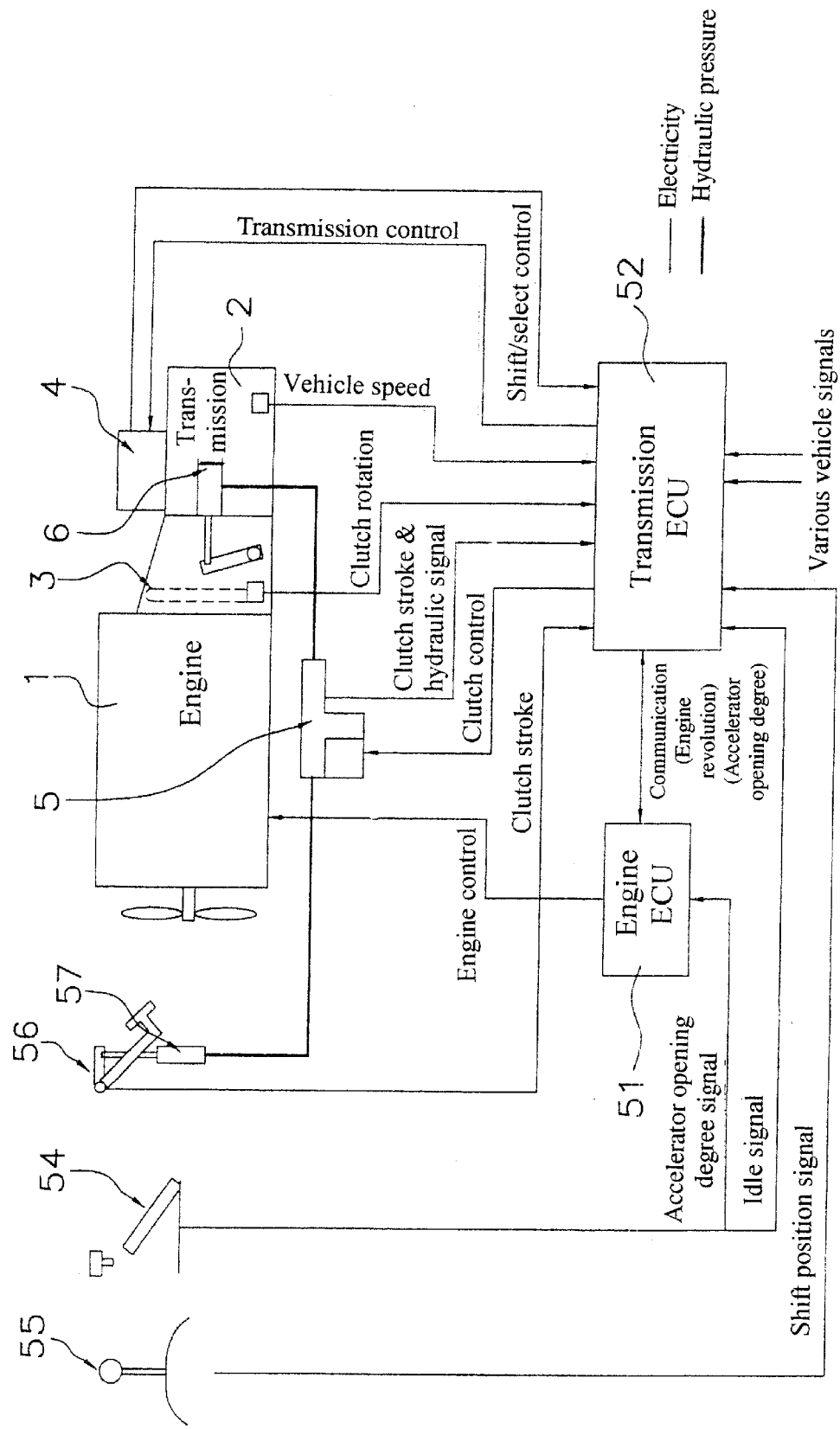
FIG. 1 is a view of a system chart of a manual/automatic transmission in accordance with a preferred embodiment of the present invention.

FIG. 1 shows a system chart of a manual/automatic transmission according to a preferred embodiment of the present invention. In FIG. 1, a clutch 3, which includes a dry single disc clutch disc, is disposed between an engine 1 and a transmission 2. As an actuator for driving the transmission 2, a gear shifting device 4 is provided. As an actuator for driving the clutch 3, a clutch actuator 5 is provided. The clutch actuator 5 has a master cylinder 8 connected to a slave cylinder 6 provided in a vicinity of the clutch 3 through a hydraulic circuit.

In this system, an engine ECU 51 and a transmission ECU 52 are provided and arranged to communicate with each other. For example, both the engine ECU 51 and the transmission ECU 52 can exchange engine revolution information and accelerator opening degree information with each other. The engine ECU 51 controls the engine 1. An accelerator opening degree signal from an accelerator pedal 54 is input to the engine ECU 51.

The transmission ECU 52 is provided mainly to control the clutch and transmission. The transmission ECU 52 outputs a clutch control signal to the clutch actuator 5 and a transmission control signal to the gear shifting device 4. These control signals are preferably signals for driving various motors. Signals from various sensors are input to the transmission ECU 52. An idle signal from the accelerator pedal 54, a shift position signal from a shift lever 55, a clutch stroke signal from a clutch pedal 56, a clutch stroke signal and a hydraulic signal from the clutch actuator 5, a clutch rotation signal from the clutch 3, a vehicle speed signal from the transmission 2, and a shift/select stroke signal from the gear transmission 4 are input to the transmission ECU 52.

In the above-described system, clutch and gear shifting operations are automatically controlled by the transmission ECU 52. It is also possible to employ selectively manual operation in which the gear shifting operation is conducted by operating the shift lever 55.

A second master cylinder 57 interlocked with the clutch pedal 56 is connected to the slave cylinder 6 through an oil path. Therefore, if a driver operates the clutch pedal 56, hydraulic pressure is supplied from the second master cylinder 57 to the slave cylinder 6 to conduct clutch disengaging/engaging operations. In this embodiment, the clutch pedal 56 is used only when an electrical malfunction of the clutch actuator 5 or the like occurs. The clutch pedal 56 is for emergency use and is folded in normal traveling.

(2) Structure of Clutch Actuator

Figure 2:
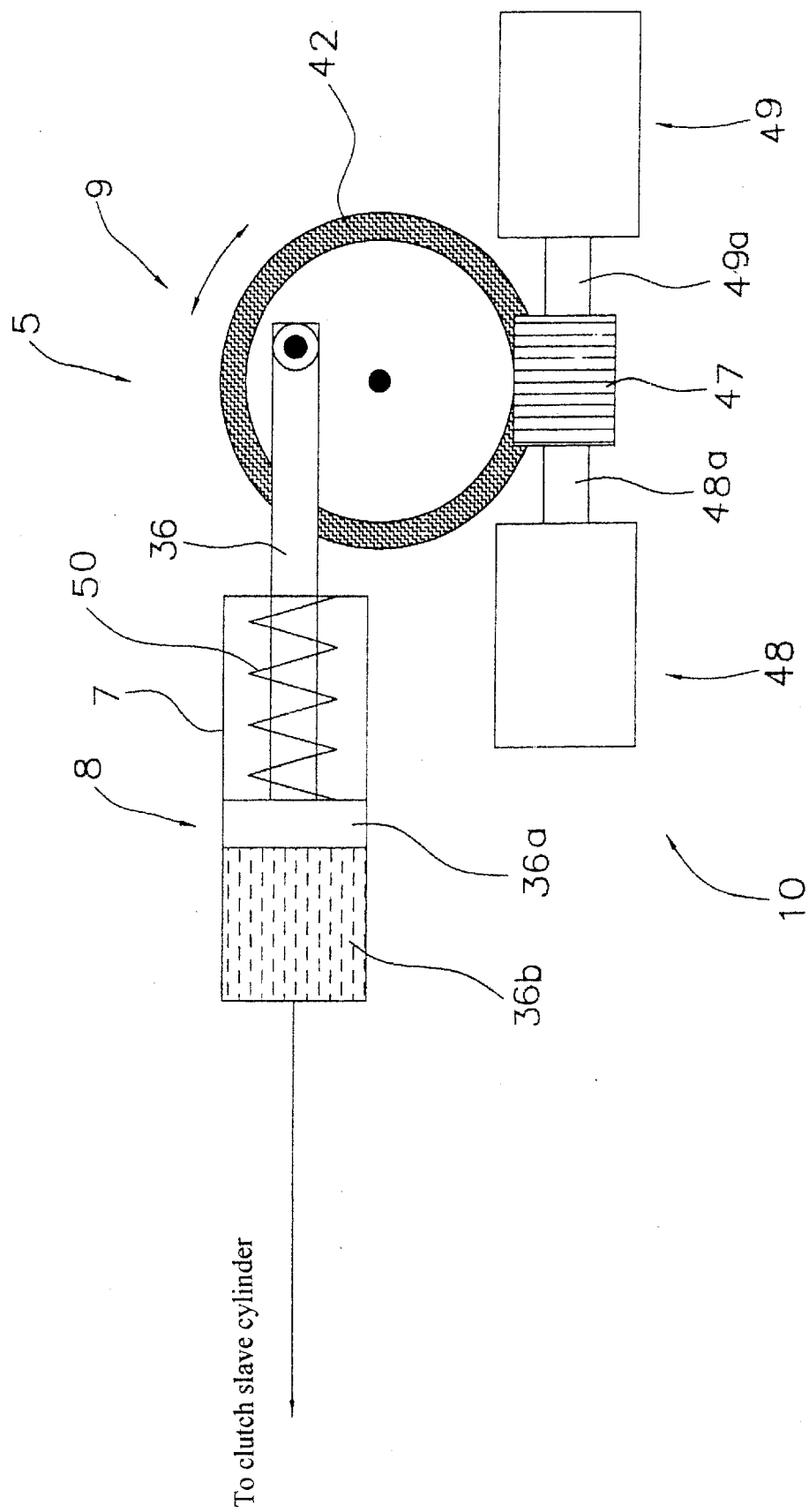
FIG. 2 is a view of a schematic diagram of a clutch actuator of the transmission of FIG. 1.

A structure of the clutch actuator 5 will be described in detail referring to FIG. 2. The clutch actuator 5 is mainly formed of the aforementioned master cylinder 8, a motion convening mechanism 9, and a control motor mechanism 10. In the master cylinder 8, a piston 36a disposed in a cylinder main body 7 forms an oil chamber 36b. The oil chamber 36b is connected to the above-described slave cylinder 6. The motion convening mechanism 9 converts rotation of two motors 48 and 49 to an axial motion. The motion convening mechanism 9 is formed of a rod 36, a worm wheel 42, and a worm gear 47. The rod 36 has one end inserted into the cylinder main body 7 to contact with the piston 36a. The worm wheel 42 is locked to an opposing end of the rod 36. The worm wheel 42 forms a crank mechanism with the rod 36. The worm gear 47 is engaged with the worm wheel 42. If the worm gear 47 rotates, the worm wheel 42 rotates, and the rod 36 moves linearly in a longitudinal direction.

The control motor mechanism 10 is formed of the two motors 48 and 49. The two motors 48 and 49 may be any of a direct-current motor, an alternating-current motor, an SR motor, a stepping motor, and the like. The two motors 48 and 49 are disposed at opposite ends of the worm gear 47 and rotary shafts 48a and 49a of the motors are respectively fixed to the respective ends of the worm gear 47. As a result, torque of the two motors 48 and 49 is input to the worm gear 47. Rotation and stoppage of the two motors 48 and 49 are controlled by the clutch control signal from the above-described transmission ECU 52.

In the cylinder main body 7, an assist spring 50 is disposed in a space on a side opposite the oil chamber 36b. The assist spring 50 constantly biases the piston 36a toward an opposite side (in other words, the clutch engaging direction) to the oil chamber 36b thereby to save horsepower of the motors.

(3) Speed Changing Operation

Referring to FIG. 1, the transmission ECU 52 shifts gears according to the shift position signal from the shift lever 55 in a manual transmission mode and according to the signals from the various sensors in an automatic transmission mode.

The transmission ECU 52 outputs the clutch control signal to the clutch actuator 5. As a result, the two motors 48 and 49 rotate to rotate the worm gear 47, as seen in FIG. 2. Thus, the worm wheel 42 is driven and the rod 36 moves in a longitudinal direction to push the piston 36a. As a result, hydraulic pressure is supplied from the oil chamber 36b to the slave cylinder 6 and the clutch 3 is disengaged shown FIG. 1. Then, the transmission ECU 52 outputs the transmission control signal to the gear shifting device 4 and drives a motor (not shown) thereby to shift gears. Finally, the transmission ECU 52 outputs the clutch control signal to the clutch actuator 5. As a result, the two motors 48 and 49 rotate reversely to rotate the worm gear 47 as shown in FIG. 2. Thus, the worm wheel 42 is driven and the rod 36 and the piston 36a move in such a direction as to come out of the cylinder main body 7. As a result, the hydraulic pressure to the slave cylinder 6 is cancelled to engage the clutch 3.

In the above gear shifting operation, because the two motors 48 and 49 are used, torque input to the worm gear 47 becomes large and moving speed of the piston 36a, i.e., operating speed of the clutch 3 is increased. Moreover, since the two motors 48 and 49 are used, the clutch operations can be conducted by one motor, even if one motor malfunctions or if a break in a signal line between one of the motors and the transmission ECU 52 occurs. In this case, the vehicle would not be disabled from traveling, however, due to a reduction in the operating speed of the clutch, gear changing would not proceed as smoothly.

Although connection of the clutch 3 and the clutch actuator 5 with each other is established by using hydraulic pressure, it is also possible to connect them through a cable.

It is also possible to replace the worm gear structure with a normal gear reducing mechanism. In this case, even if reaction force of the clutch 3 acts on the clutch actuator 5, the clutch 3 is not disconnected and stops in a vicinity of a half-clutch position, because a load is applied to the piston 36a by the assist spring 50.

In the clutch driving device according to the invention, because the two motors are used, speed of disengaging/engaging operations of the clutch is increased.

(4) Structure of Gear Shifting Device

Figure 4:
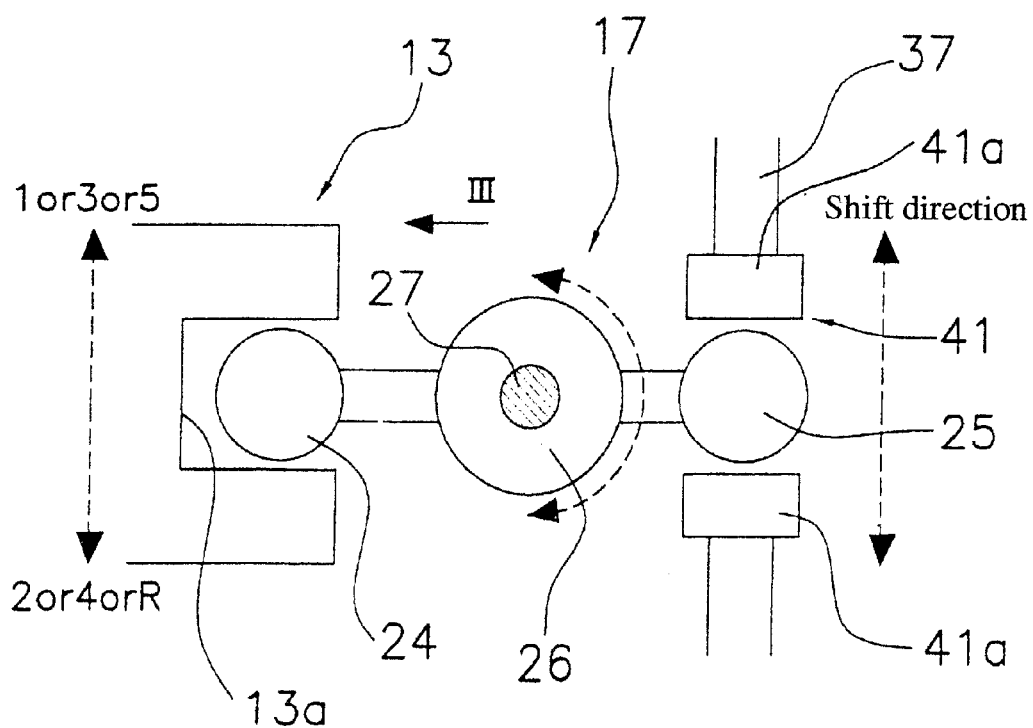
FIG. 4 is a view taken along a direction of an arrow IV in FIG. 2 and illustrates a relationship between a lever and other members.
Figure 5:
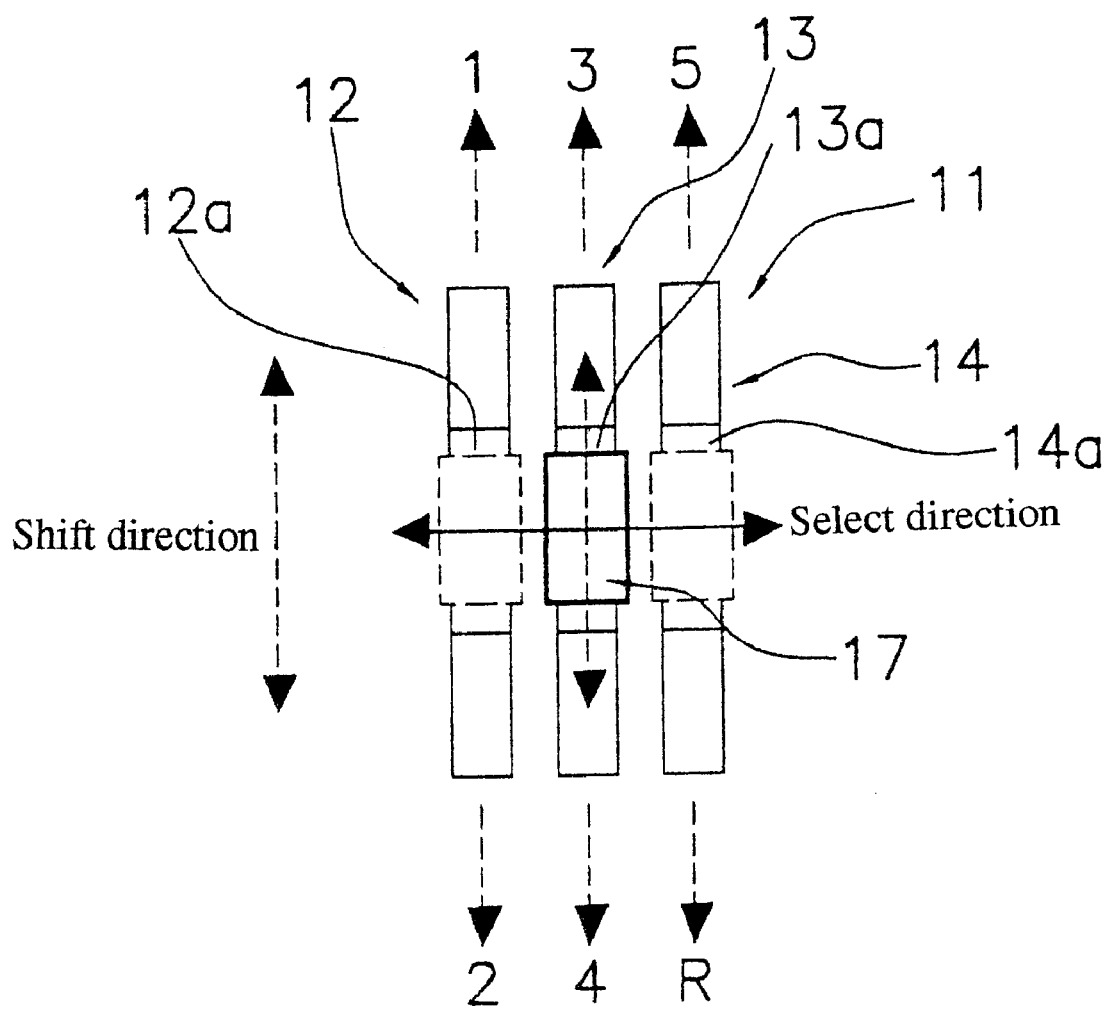
FIG. 5 is a view taken in a direction of an arrow III in FIG. 4 illustrating a relationship between a transmission rack and the lever.

A structure of the gear shifting device 4 in accordance with a preferred embodiment of the present invention will be described in detail referencing FIGS. 3 to 5.

The gear shifting device 4 drives a transmission rack 11 of the transmission 2 based on a transmission control signal from the transmission ECU 52. As shown in FIG. 5, the transmission rack 11 is formed of first, second, and third racks 12, 13, and 14, respectively. The first, second, and third racks 12, 13, and 14 are arranged in a select direction (lateral direction in FIG. 5) and can move to opposite sides in a shift direction (vertical direction in FIG. 5) from a neutral position shown in FIG. 5. The first rack 12 can move to positions of first and second gears, the second rack 13 can move to positions of third and fourth gears, and the third rack 14 can move to positions of fifth and reverse gears. Recessed portions 12a, 13a, and 14a are formed respectively at central portions of upper faces of the first to third racks 12, 13, and 14, respectively.

Figure 3:
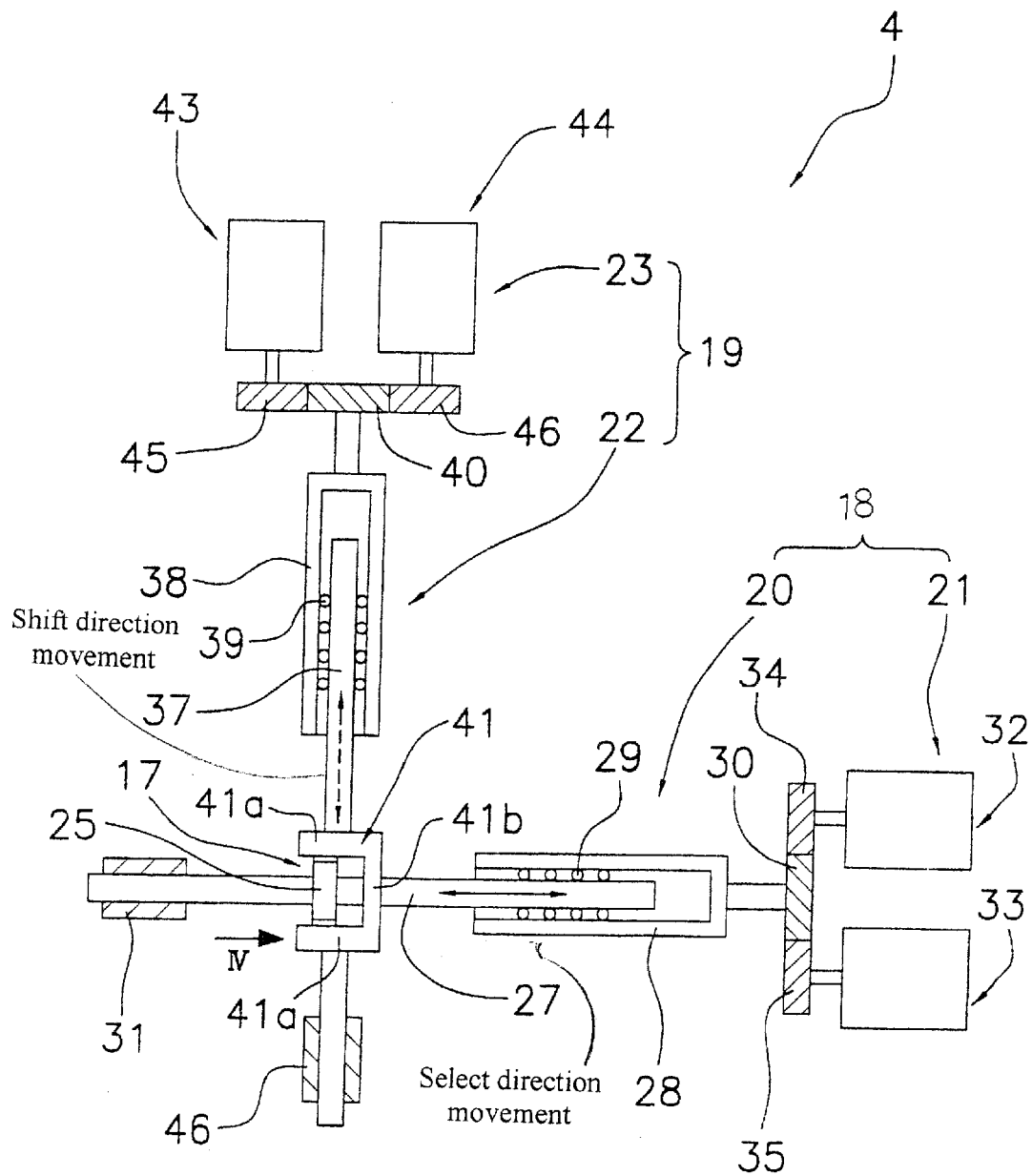
FIG. 3 is a view of a schematic diagram of a gear shifting device of the transmission of FIG. 1.

As shown in FIG. 3, the gear shifting device 4 is formed of a lever 17, a select direction driving mechanism 18, and a shift direction driving mechanism 19. The lever 17 selects from among the first, second, and third racks 12, 13, and 14 when the lever 17 is moved in the select direction by the select direction driving mechanism 18. The lever 17 moves the first, second, and third racks 12, 13, and 14 in the shift direction with the shift direction driving mechanism 19. As shown in FIG. 4, the lever 17 extends vertically with respect to an upper face of the transmission 2 and opposite ends of the lever 17 can swing about an axial center extending in the select direction. The lever 17 has a first end 24 on a side of the transmission 2, a second end 25 on an opposite side, and a fulcrum portion 26 at an intermediate portion. The first end 24 is disposed in any of the recessed portions 12a, 13a, and 14a of the first, second and third racks 12, 13, and 14 and can move among the recessed portions 12a, 13a, and 14a. The first end 24 and the second end 25 are in thin circular-cylindrical shapes with outer peripheral faces oriented in the shift direction. A rod 27 of the select direction driving mechanism 18, which will be described later, passes through the fulcrum portion 26. Therefore, the lever 17 can swing about the rod 27. In other words, if the second end 25 is driven to one side in the shift direction, the first end 24 moves to the other side in the shift direction and can drive any of the transmission racks 12, 13, and 14.

As seen in FIG. 3, the select direction driving mechanism 18 includes a ball screw mechanism 20 (motion converting mechanism) and a control motor mechanism 21. The control motor mechanism 21 generates a rotating force based on the signal from the transmission ECU 52. The ball screw mechanism 20 converts the rotating force of the control motor mechanism 21 to a force in a linear direction and drives the lever 17 in the select direction.

The ball screw mechanism 20 is mainly formed of the rod 27, an outer tube 28, and balls 29. An end of the rod 27 is disposed in the outer tube 28 and supported by the plurality of balls 29. The other end of the rod 27 is supported for rotation by a bushing 31. An intermediate portion of the rod 27 passes through the fulcrum portion 26 of the lever 17 shown in FIG. 4. Thus, the rod 27 supports the lever 17 for rotation and moves in an axial direction thereby to move the entire lever 17 in the axial direction.

As a mechanism for converting rotary motion to linear motion, merely a screw mechanism, a rod mechanism, or the like may be employed besides the ball screw mechanism.

Referring to FIG. 3, the control motor mechanism 21 mainly includes two motors 32 and 33. The motors 32 and 33 may be any of a direct-current motor, an alternating-current motor, an SR motor, a stepping motor, and the like. Gears 34 and 35 are respectively fixed to shafts of the respective motors 32 and 33. The gears 34 and 35 are engaged with a gear 30 fixed to the outer tube 28. Therefore, torque from the two motors 32 and 33 is input to the gear 30. In other words, because torque transmitted from the control motor mechanism 21 to the ball screw mechanism 20 becomes large, it is possible to drive the lever 17 in the shift direction at sufficiently high speed in spite of an inertia component of the system. By using the two motors, speed changing operation can be conducted even if a malfunction occurs in one of the motors or in the wiring of the motor.

The shift direction driving mechanism 19 includes a ball screw mechanism 22 (motion converting mechanism) and a control motor mechanism 23. The control motor mechanism 23 generates a rotating force based on the signal from the transmission ECU 52. The ball screw mechanism 22 converts the rotating force of the control motor mechanism 23 to a force in a linear direction and for driving the lever 17 in the shift direction.

The ball screw mechanism 22 is mainly formed of a rod 37, an outer tube 38, and balls 39. An end of the rod 37 is disposed in the outer tube 38 and supported by the plurality of balls 39. The other end of the rod 37 is supported for rotation by a bushing 46. A driving member 41 is fixed to an intermediate portion of the rod 37. The driving member 41 preferably has an angular U shape and is provided to correspond to the second end 25 of the lever 17. The driving member 41 is formed of contact-capable portions 41a positioned on opposite sides in the shift direction of the second end 25 and a connecting portion 41b for connecting end portions of the contact-capable portions 41a. If the driving member 41 moves in the shift direction, the contact-capable portions 41a contacts the second end 25 thereby to swing the lever 17. The second end 25 can move in the select direction between both the contact-capable portions 41a.

As a mechanism for converting rotary motion to linear motion, merely the screw mechanism, the rod mechanism, or the like may be employed besides the ball screw mechanism.

The control motor mechanism 23 mainly includes two motors 43 and 44. The motors 43 and 44 may be any of the direct-current motor, the alternating-current motor, the SR motor, the stepping motor, and the like. Gears 45 and 46 are respectively fixed to shafts of the respective motors 43 and 44. The gears 45 and 46 are engaged with a gear 40 fixed to the outer tube 38. Therefore, torque from the two motors 43 and 44 is input to the gear 40. In other words, because torque transmitted from the control motor mechanism 23 to the ball screw mechanism 22 becomes large, it is possible to drive the lever 17 and the transmission racks 12, 13, and 14 at sufficiently high speed in spite of the inertia component of the system. By using the two motors, speed changing operation can be conducted even if a malfunction occurs in one of the motors or in the wiring of the motor.

As described above, driving of the lever 17 is conducted at high speeds in both the shift and select directions in the present embodiment. Therefore, movement of the transmission rack 11, i.e., gear shifting of the transmission 2 is conducted at higher speeds than in the prior art.

(5) Speed Changing Operation

Referring to FIG. 1, in normal travel, the transmission ECU 52 conducts gear shifting operations according to the shift position signal from the shift lever 55 in the manual transmission mode and according to the signals from the various sensors in the automatic transmission mode. The transmission ECU 52 outputs the clutch control signal to the clutch actuator 5. As a result, hydraulic pressure is supplied from the master cylinder in the actuator 5 to the slave cylinder 6 to disengage the clutch 3. Then, the transmission ECU 52 outputs the transmission control signal to the gear shifting device 4 and drives the control motor mechanisms 21 and 23 thereby to shift gears. Finally, the transmission ECU 52 outputs the clutch control signal to the clutch actuator 5. As a result, the hydraulic pressure to the slave cylinder 6 is cancelled to engage the clutch 3.

In the gear shifting device according to the invention, because the two motors are used, it is possible to shift gears at higher speeds than in the prior art.

The terms of degree such as "substantially," "about," and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A vehicle transmission system comprising:
   an engine;
   a transmission;
   a clutch disposed between said engine and said transmission;
   a gear shifting device configured to drive said transmission, said gear shifting device comprising,
      a first motion convening mechanism to convert rotary motion to linear motion in a first direction and to apply an operating force to said transmission, and
      a first set of motors to apply a rotating force to said first motion converting mechanism, said first set of motors comprising at least two motors
      a second motion converting mechanism to convert rotary motion to linear motion in a second direction different from said first direction and to apply an operating force to said transmission; and
      a second set of motors to apply a rotating force to said second motion converting mechanism, said second set of motors comprising at least two motors; and
   a clutch actuator configured to drive said clutch, said clutch actuator comprising,
      a third motion converting mechanism to convert rotary motion to linear motion and to apply an operating force to said clutch, and
      a third set of motors to apply a rotating force to said third motion converting mechanism, said third set of motors comprising at least two motors.

2. The vehicle transmission system according to claim 1, wherein said transmission is an automatic transmission.

3. The vehicle transmission system according to claim 1, wherein said transmission is a manual transmission.

4. The vehicle transmission system according to claim 1, wherein said transmission is a semiautomatic transmission.

5. A vehicle transmission system comprising:
   an engine;
   a transmission;
   a clutch disposed between said engine and said transmission;
   a gear shifting device configured to drive said transmission, said gear shifting device comprising,
      a first motion converting mechanism to convert rotary motion to linear motion and to apply an operating force to said transmission, said first motion converting mechanism comprising,
         a first rod,
         an outer tube, and
         a plurality of balls, such that an end of said first rod is disposed in said outer tube and supported by said plurality of balls, an opposite end of said first rod is supported for rotation by a bushing, and an intermediate portion of said first rod extends through a fulcrum portion of a lever to support the lever for rotation in an axial direction, and
      a first set of motors to apply a rotating force to said first motion converting mechanism, said first set of motors having at least two motors; and
   a clutch actuator configured to drive said clutch, said clutch actuator comprising
      a second motion converting mechanism to convert rotary motion to linear motion and to apply an operating force to said clutch, and
      a second set of motors to apply a rotating force to said second motion converting mechanism, said second set of motors having at least two motors.

6. The vehicle transmission system according to claim 5, wherein said gear shifting device further comprises
   a third motion converting mechanism for converting rotary motion to linear motion and for applying an operating force to said transmission; and
   a third set of motors for applying a rotating force to said third motion converting mechanism, said third set of motors comprising at least two motors.

7. A vehicle transmission system comprising:
   an engine;
   a transmission;
   a clutch disposed between said engine and said transmission;
   a gear shifting device configured to drive said transmission, said gear shifting device comprising,
      a first motion converting mechanism to convert rotary motion to linear motion and to apply an operating force to said transmission, and
      a first set of motors to apply a rotating force to said first motion convening mechanism, said first set of motors having at least two motors; and
   a clutch actuator configured to drive said clutch, said clutch actuator comprising
      a second motion convening mechanism to convert rotary motion to linear motion and to apply an operating force to said clutch, said second motion converting mechanism comprising,
         a second rod,
         a worm wheel, and
         a worm gear, such that an end of said second rod is inserted into a cylinder to contact a piston, an opposite end of said second rod is engaged with said worm wheel to form a crank mechanism, and said worm gear is engaged with said worm wheel such that when said worm gear rotates said worm wheel rotates moving said second rod in a linear direction, and a second set of motors to apply a rotating force to said second motion converting mechanism, said second set of motors having at least two motors.

8. A vehicle transmission system comprising:

an engine;

a transmission;

a clutch disposed between said engine and said transmission;

a gear shifting device configured to drive said transmission, said gear shifting device comprising,
 a first motion convening mechanism to convert rotary motion to linear motion in a first direction and to apply an operating force to said transmission, and
 a first set of motors to apply a rotating force to said first motion converting mechanism, said first set of motors having at least two motors,
 a second motion converting mechanism to convert rotary motion to linear motion in a second direction different from said first direction and to apply an operating force to said transmission; and
 a second set of motors to apply a rotating force to said second motion convening mechanism, said second set of motors having at least two motors.

9. The vehicle transmission system according to claim 8, wherein said transmission is an automatic transmission.

10. The vehicle transmission system according to claim 8, wherein said transmission is a manual transmission.

11. The vehicle transmission system according to claim 8, wherein said transmission is a semiautomatic transmission.

12. The vehicle transmission system according to claim 8, further comprising,
 a clutch actuator configured to drive said clutch, said clutch actuator comprising,
  a motion converting mechanism to convert rotary motion to linear motion and to apply an operating force to said clutch, and
  a third set of motors to apply a rotating force to said motion converting mechanism, said third set of motors comprising at least two motors.

13. The vehicle transmission system according to claim 12, wherein said motion convening mechanism comprises a rod;

a worm wheel; and a worm gear.

14. A vehicle transmission system comprising:

an engine;

a transmission;

a clutch disposed between said engine and said transmission;

a gear shifting device configured to drive said transmission, said gear shifting device comprising,
 a first motion converting mechanism to convert rotary motion to linear motion and to apply an operating force to said transmission, said first motion converting mechanism comprising,
  a rod having an end, an intermediate portion extending through a fulcrum portion of a lever to support said lever for rotation in an axial direction, and an opposite end being supported by a bushing,
  an outer tube, said end of said rod being disposed in said outer tube, and
  a plurality of balls, said end of said rod being supported by said plurality of balls, and
 at least two motors to apply a rotating force to said motion converting mechanism.

15. The vehicle transmission system according to claim 14, wherein said transmission is an automatic transmission.

16. The vehicle transmission system according to claim 14, wherein said transmission is a manual transmission.

17. The vehicle transmission system according to claim 14, wherein said transmission is a semiautomatic transmission.

18. The vehicle transmission system according to claim 14, further comprising a clutch actuator configured to drive said clutch.

19. The vehicle transmission system according to claim 18, wherein said transmission is a semiautomatic transmission and said gear shifting device further comprises,
 a second motion converting mechanism to convert rotary motion to linear motion and to apply an operating force to said transmission, and
 a second set of motors to apply a rotating force to said second motion converting mechanism, said second set of motors comprising at least two motors.

20. A vehicle transmission system comprising:

an engine;

a transmission;

a clutch disposed between said engine and said transmission;

a gear shifting device configured to drive said transmission; and a clutch actuator configured to drive said clutch, said clutch actuator comprising,
 a motion converting mechanism to convert rotary motion to linear motion and to apply an operating force to said clutch, said motion converting mechanism comprising,
  a rod having an end being inserted into a cylinder to contact a piston and an opposite end,
  a worm wheel, said opposite end being engaged with said worm wheel to form a crank mechanism, and
  a worm gear, said worm gear being engaged with said worm wheel such that when said worm gear rotates said worm wheel rotates moving said rod in a linear direction, and
 at least two motors to apply a rotating force to said motion converting mechanism.

* * * * *